United States Patent [19]

Hackett

[11] 4,367,458

[45] Jan. 4, 1983

[54] SUPERVISED WIRELESS SECURITY SYSTEM

[75] Inventor: Kenneth R. Hackett, Boulder, Colo.

[73] Assignee: Ultrak Inc., Broomfield, Colo.

[21] Appl. No.: 182,497

[22] Filed: Aug. 29, 1980

[51] Int. Cl.³ .......................... G08B 1/08; G08B 26/00
[52] U.S. Cl. ..................................... 340/539; 340/505; 340/506; 340/531; 340/536; 340/825.54; 367/2; 455/7; 455/9; 455/101
[58] Field of Search ................ 340/539, 505, 518, 531, 340/536, 635, 636, 152 T, 506, 825.06–825.13, 825.52, 54, 69, 825.72, 870.09, 870.11; 367/95–97, 2, 93, 94; 455/7, 9, 11, 13, 50, 63, 67, 101, 102; 343/6.5 R, 6.5 SS, 6.8 R

[56] References Cited

U.S. PATENT DOCUMENTS

| | | | |
|---|---|---|---|
| 3,696,384 | 10/1972 | Lester | 340/152 T |
| 3,815,093 | 6/1974 | Caretto et al. | 340/152 T |
| 3,925,763 | 12/1975 | Wadhwani et al. | 340/539 |
| 3,946,315 | 3/1976 | Tustison | 455/7 |

FOREIGN PATENT DOCUMENTS 2368766 5/1978 France ........................ 340/531

*Primary Examiner*—John W. Caldwell, Sr.
*Assistant Examiner*—Donnie L. Crosland
*Attorney, Agent, or Firm*—Charles E. Pfund

[57] ABSTRACT

An ultrasonic communication system capable of wireless installation and supervised operation is achieved by communicating each information bit as two distinct ultrasonic frequencies separated in frequency enough to assure that the signal strength of both transmissions will not be in a deep null at the receiver location at the same time. The transmissions can be coded with a format that recognizes the correct data transmission even if reception of one frequency is lost. By use of transponders and other auxiliary units with periodic polling, supervised operation throughout a building can be maintained with events such as intrusion, fire or emergency as well as failures of particular units of the system reported.

22 Claims, 13 Drawing Figures

T = TRANSPONDER
AR = ACOUSTICAL REPEATER
PB = EMERGENCY REPORTING UNIT (PANIC BUTTON)

TYPICAL RESIDENTIAL INSTALLATION

T = TRANSPONDER
AR = ACOUSTICAL REPEATER
PB = EMERGENCY REPORTING UNIT (PANIC BUTTON)

TYPICAL RESIDENTIAL INSTALLATION

FIG. I

PHASOR DIAGRAM OF A SIGNAL, ONE FREQUENCY, ARRIVING VIA 2 SEPARATE PATHS SHOWN AT DIFFERENT POINTS IN SPACE.

TYPICAL RECORDING OF SIGNAL STRENGTH MEASURED AT A SINGLE POINT IN SPACE VS. TIME, A SINGLE FREQUENCY.

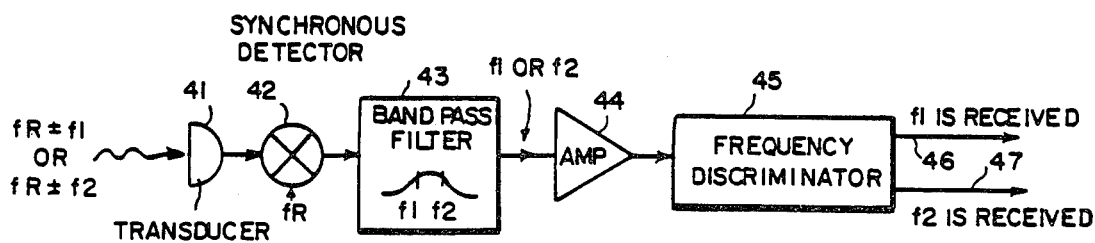
FIG. 4 SIGNAL RECOVERY BLOCK DIAGRAM
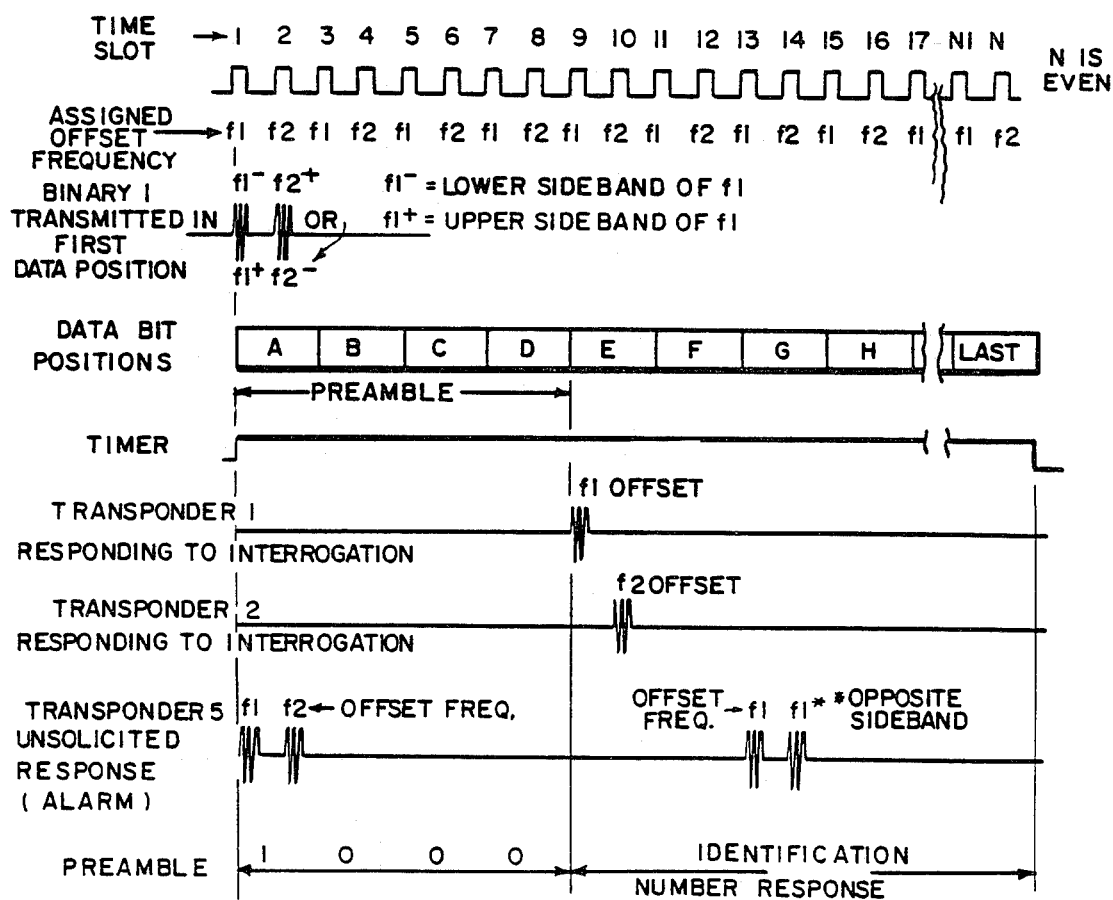
FIG. 5 BASIC TIMING DIAGRAM

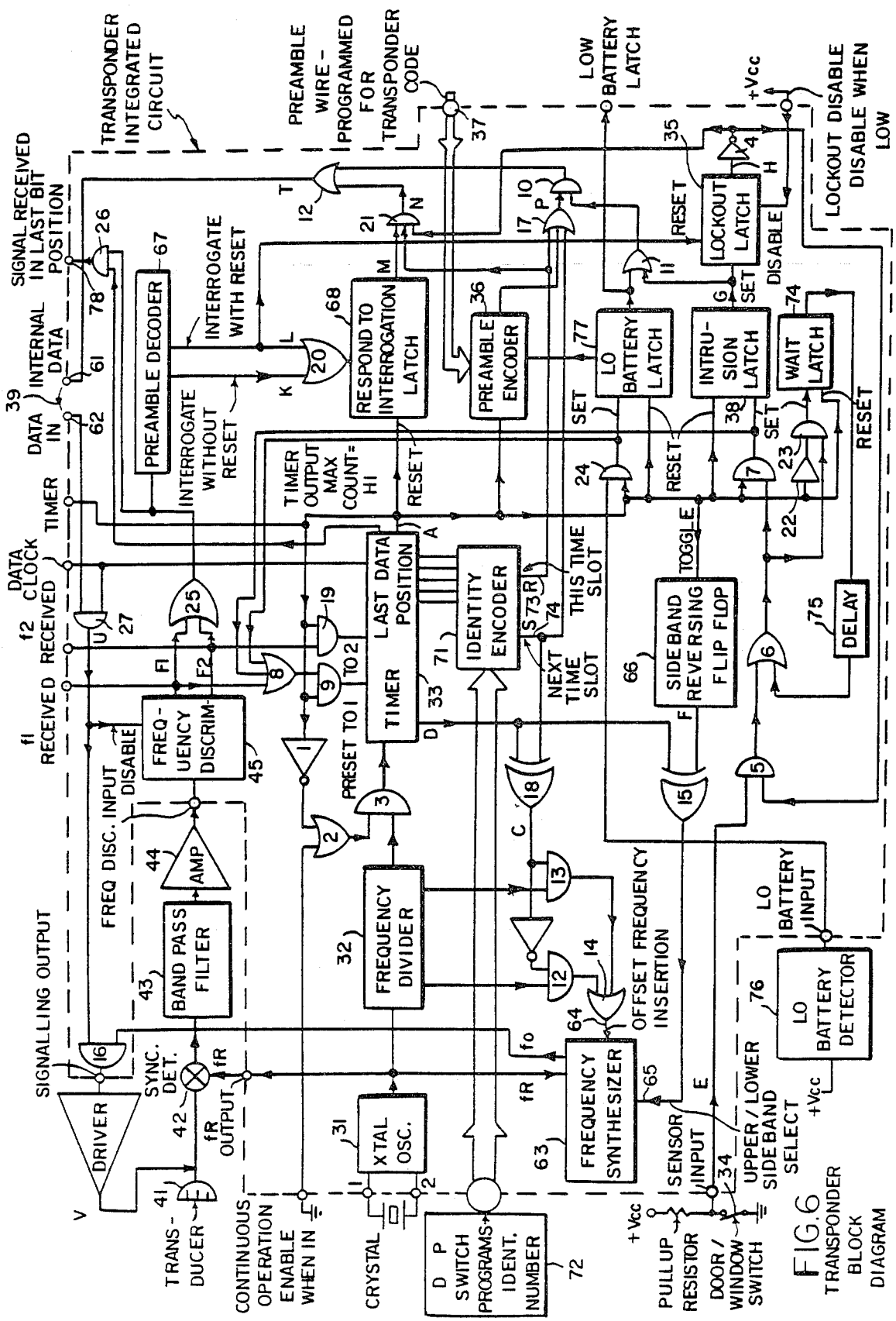
FIG. 6 TRANSPONDER BLOCK DIAGRAM

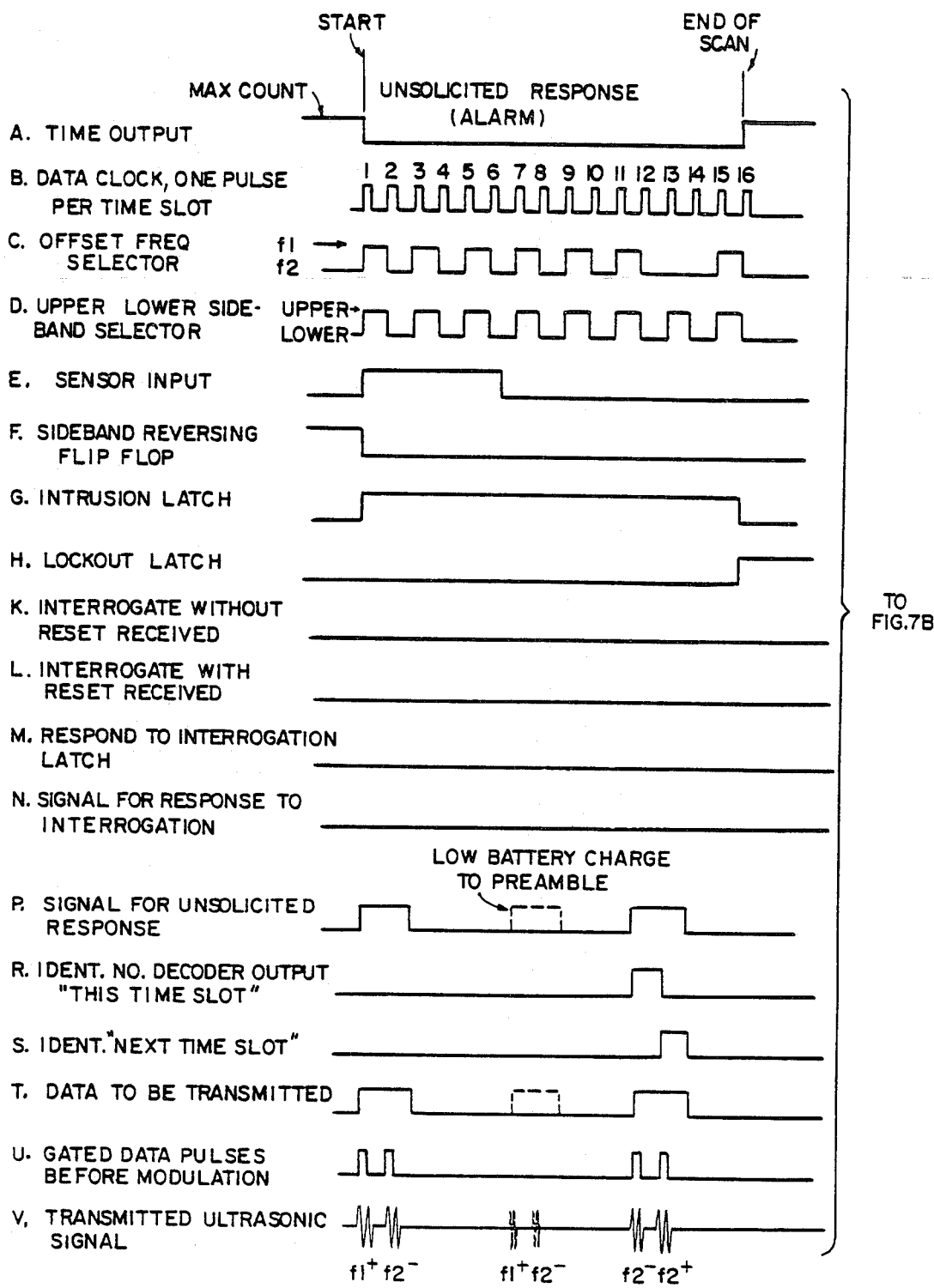
FIG.7A    TRANSPONDER TIMING DIAGRAM

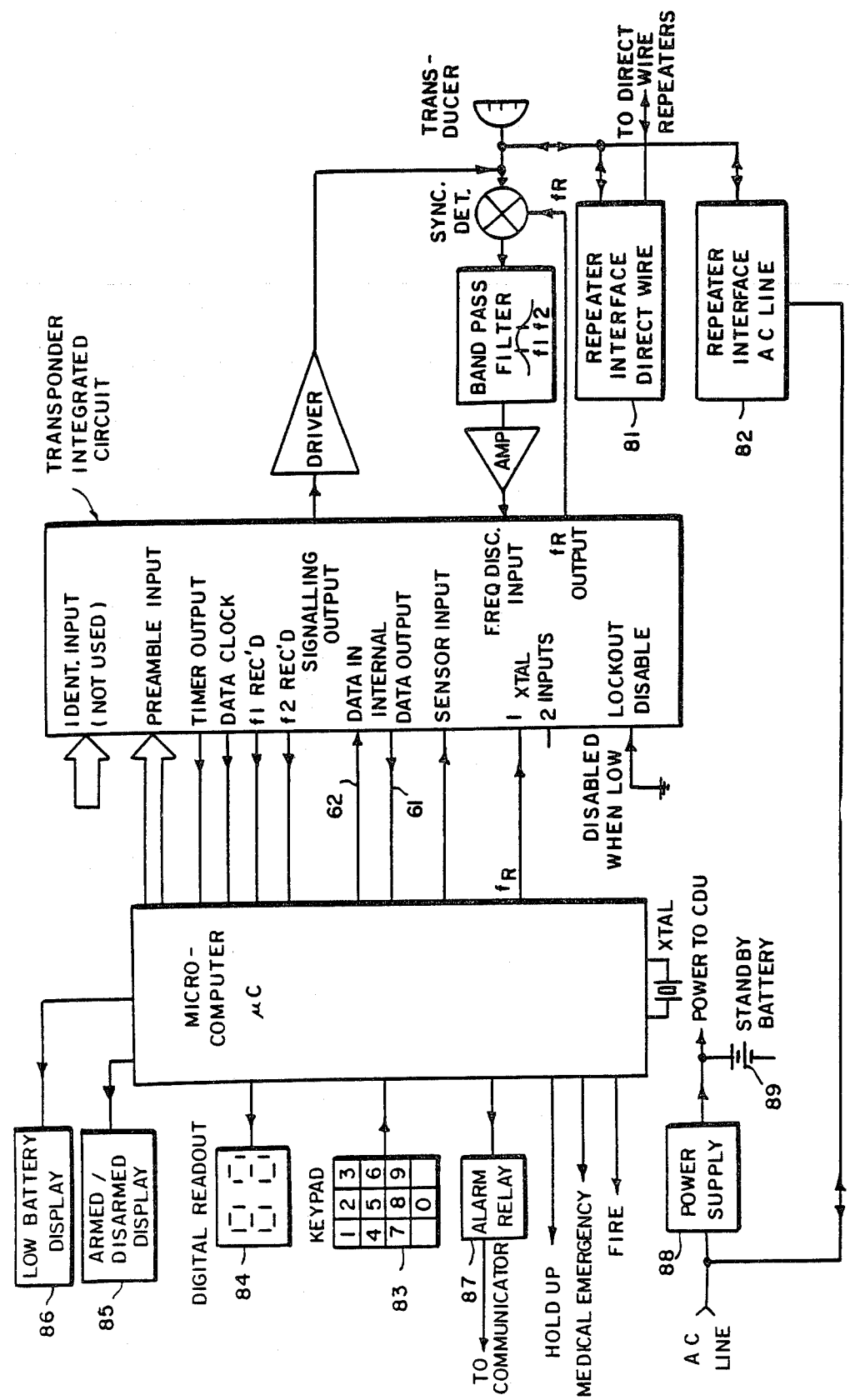
FIG.8 CENTRAL DATA UNIT (CDU)

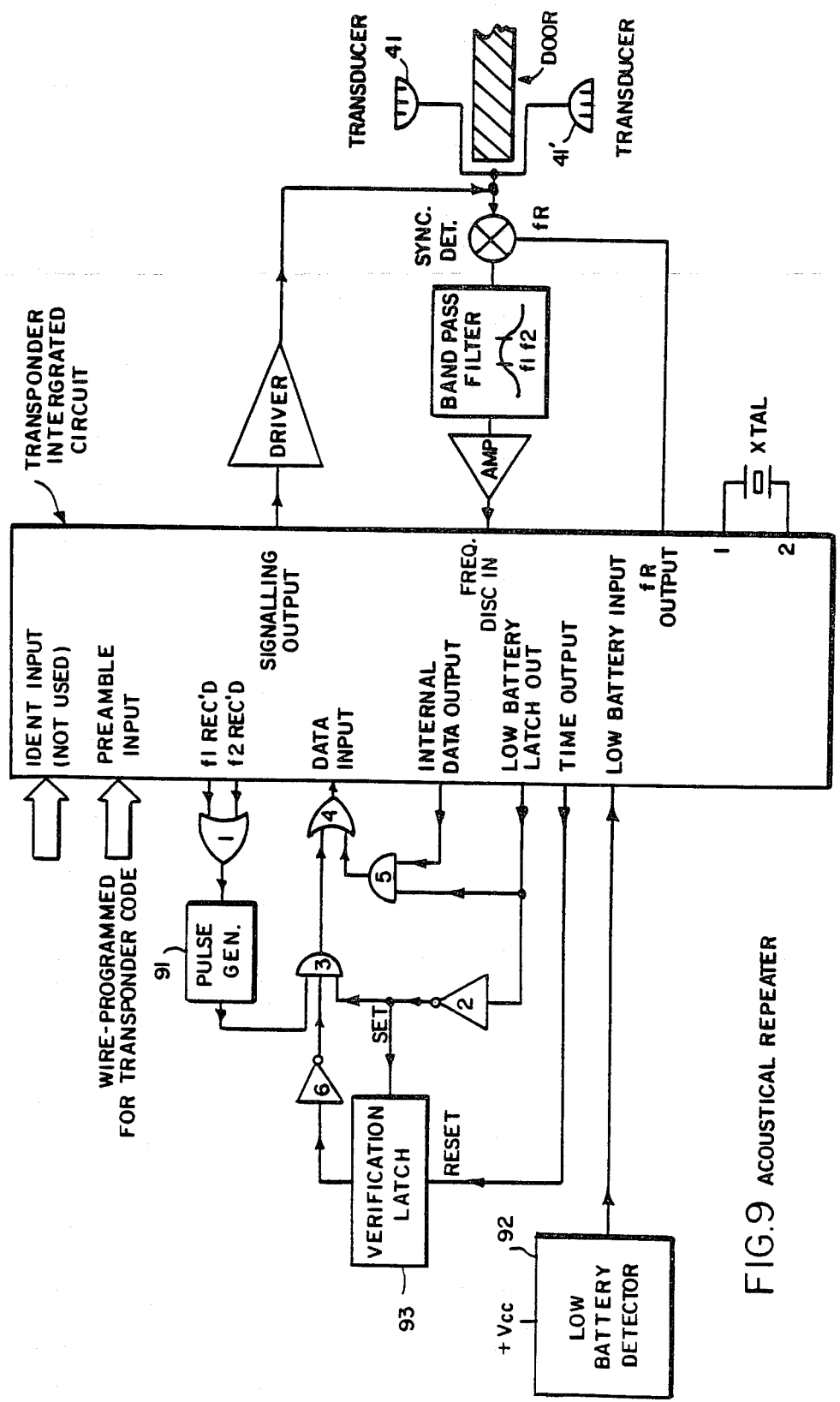
FIG.9 ACOUSTICAL REPEATER

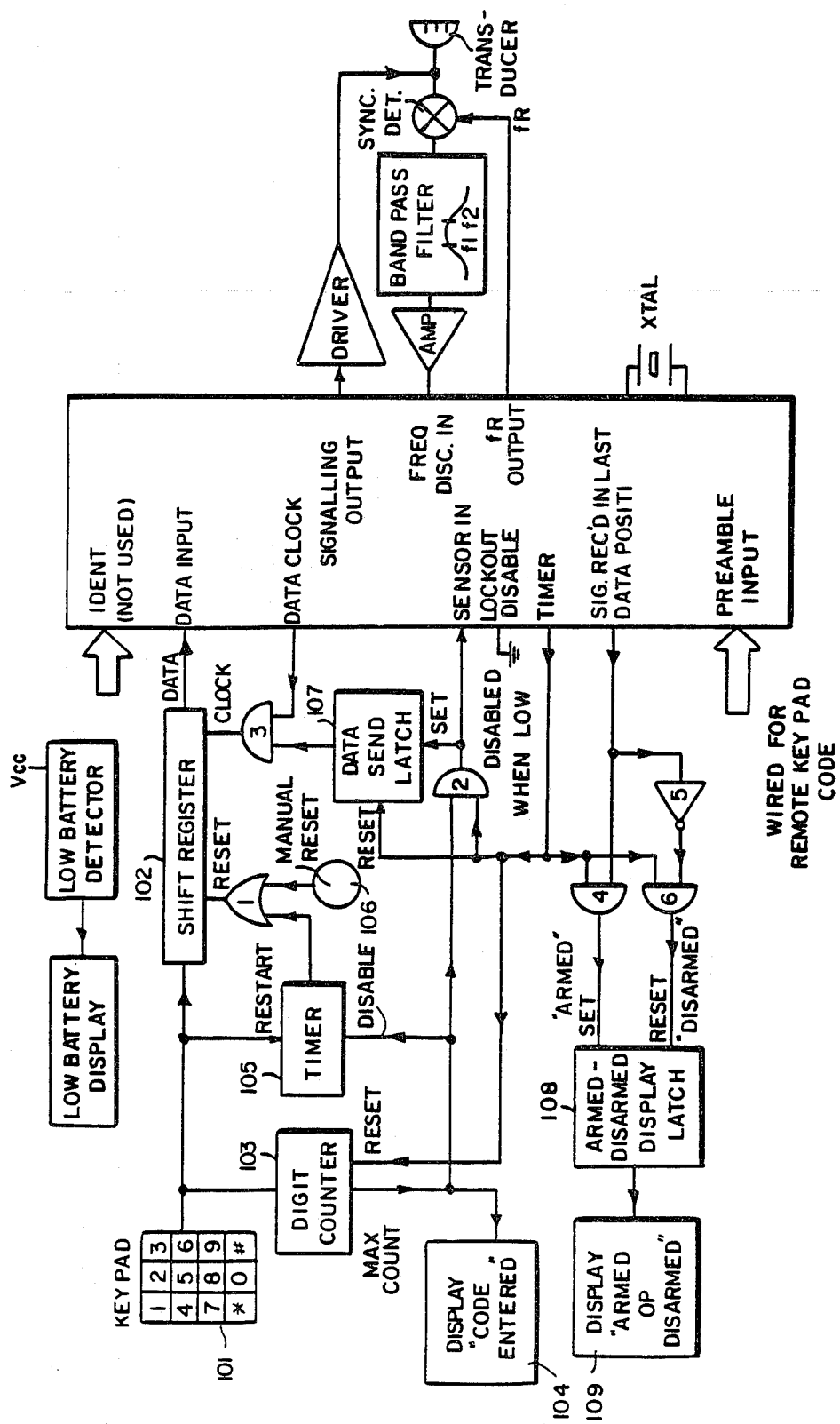
FIG. 10 REMOTE KEY PAD

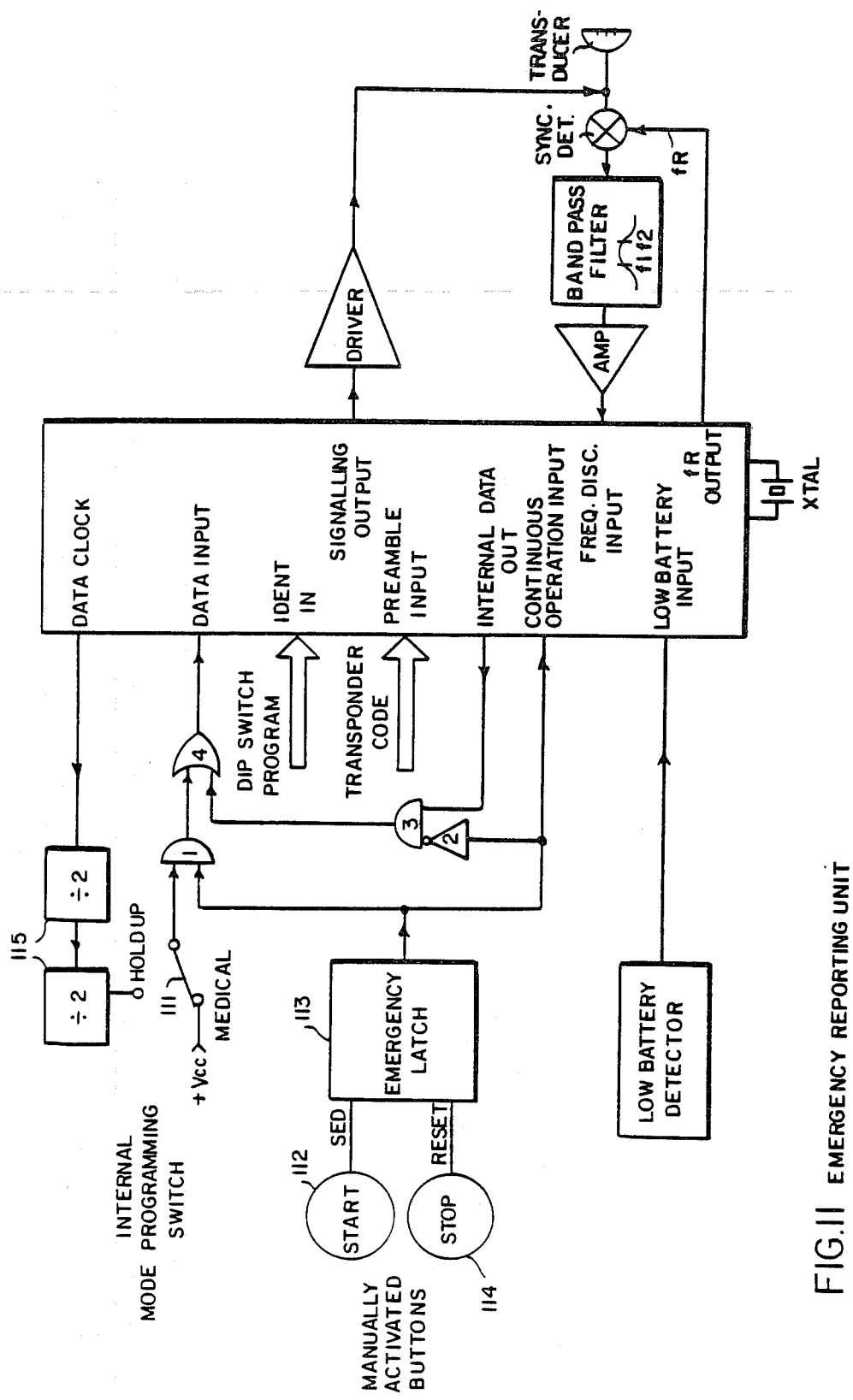
FIG.11 EMERGENCY REPORTING UNIT "PANIC BUTTON"

SUPERVISED WIRELESS SECURITY SYSTEM

BACKGROUND OF THE INVENTION

A traditional security system consists of a plurality of intrusion sensors located at each secured opening, such as doors and windows. As a rule, the sensors are magnetically operated switches. When the door or window is closed, these switches are held closed. In a supervised system all the switches are connected in series, then connected to a control unit. If one or more switches open or the interconnecting wire is cut, the break in the circuit is detected by the control unit and an alarm condition is reported.

A non-supervised system, which is seldom used, uses switches which are open when the secured door or window is closed. The switches close when the opening is breached. This completes a circuit which is detected by the control unit and an alarm occurs. If the wire to the switches is cut before an intrusion occurs, it is not detected since the circuit simply remains open.

Open types of intrusion sensors such as infrared, microwave, and ultrasonic motion detectors, or photobeams (electric eye), can also be used. Each sensor contains a relay which is energized when no intrusion is occuring. If an intrusion is detected or the internal power supply fails, the relay becomes deenergized and its contacts open breaking the circuit (in a supervised system) to signal an alarm.

One of the problems with prior art systems is the provision of supervision where the area to be protected covers multiple rooms. Wiring the central and remote units of a complete system in such spaces involves substantial expense at installation time and except in commercial warehouse space or the like the wiring must be concealed for aesthetic purposes. The cost of such installations is prohibitive for the individual home or small business and greatly increases the expense for large commercial installations. The attempt to couple the elements of a system by radio link would avoid the problem of wiring but introduces the problem of interference between systems and units of a system since the radio waves transmit through the walls of a building and cause interference within the system or with other radio equipment. The Federal Communications Commission (FCC) in the United States and similar agencies in other countries do not ordinarily permit periodic communication between automatic system elements and thus radio linked systems are incapable of being supervised, i.e., capable of testing their own condition for ready operability in the event of any alarm condition. Ultrasonic systems, on the other hand, have their energy confined by the walls of a room and thus do not present a problem of interference between units which are located in adjoining rooms. This property prevents communication between units of a system which have to cover more than one room. In addition the problem of null conditions for ultrasonic energy is severe because the transmission paths change with environmental parameters such as temperature and humidity such that communication between ultrasonic units cannot be assured at any given time even though no null was experienced when the unit was installed.

SUMMARY OF THE INVENTION

The present invention provides a supervised multifunction security system based on ultrasonic energy transmission which is adapted to overcome the limitations of previous ultrasonic systems in that communication between multiroom enclosures is achieved and the communication signal is frequency and time redundant in a manner which avoids the loss of signal due to nulls. The major units of the system are primarily interconnected by ultrasonic sound waves and thus require no installation wires. Where convenient, auxiliary units may be connected into the system by wire or coupling through the AC wiring in the building without adding any significant installation expense or inconvenience.

The system utilizes a plurality of transponders which can be interrogated from a central data unit for reporting back operative or inoperative condition and alarm conditions in the vicinity of local transponders. Transmission between adjacent rooms is accomplished by acoustic repeaters which are adapted to provide two-way communication between the central data unit and remote transponders. Multiple functions are provided by the system by initial programming and by key control operation of the system once it is installed.

Accordingly, it is a principal object of the present invention to provide a supervised multiroom capability in a supervised security system which eliminates the requirement for wire connection between units and does not present any problems of radio interference or other regulated energy emission limitation.

A further object of the invention is to provide an economical security system which makes supervised security available on an installed basis at a cost less than provided by present systems and in which the system can be recovered without expense or defacing of the building in the event that it is desired to remove the system.

Still another object is to provide a supervised security system which is reliable in terms of the communication of the data required among the multiple units of the system without the use of wire connections between the primary units of the system and at the same time permits polling of the units of the system for periodically checking overall operativeness thereby to assure that the system is always operative and capable of detecting and reporting an alarm as intended thereby complying with requirements for insurance, Underwriter's Laboratory approval and other advantages such as insurance discounts.

These and other objects will become apparent from the following detailed description taken in conjunction with the appended drawings.

BRIEF DESCRIPTION OF THE DRAWINGS

FIG. 4 is a block diagram of the synchronous detector signal recovery system for a four-frequency transmission as used in accordance with the disclosed embodiment.

FIG. 5 shows a basic timing diagram for the system.

FIG. 6 is a block diagram of a transponder contemplated to be embodied as an integrated circuit for use in various units of the system.

FIG. 8 is a block diagram of the central data unit of the system.

FIG. 9 is a block diagram of an acoustical repeater as used in the system.

FIG. 10 is a block diagram of a remote keypad used in the system.

FIG. 11 is a block diagram of an emergency reporting unit used in the system.

DESCRIPTION OF THE PREFERRED EMBODIMENT

General Description

Figure 1:
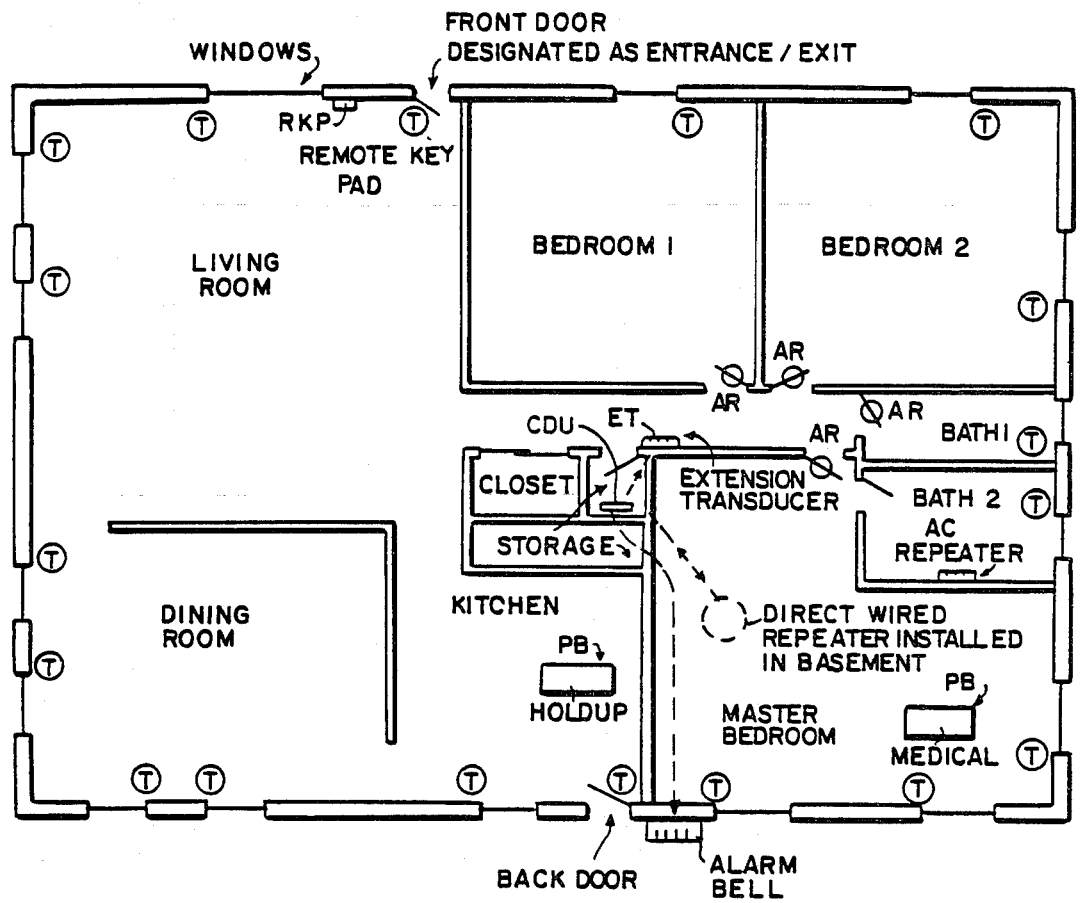
FIG. 1 is a floor plan view of a home illustrating a typical residential installation of the system of the invention.

The general location and function of the components of the system will first be described.

Central Data Unit (CDU)

A Central Data Unit (CDU) (shown and described with reference to FIG. 8) is located near an entrance or other convenient location such as concealed in a closet. The CDU is powered from the AC mains and has a constantly charging standby battery for use in the event of a power failure. It has a single ultrasonic transducer used for transmitting and receiving which is located to radiate and receive ultrasonic energy in the principal space to be protected.

The CDU has a telephone-type keypad which is used for arming and disarming the system by using special code numbers. The keypad is also used for programming the system when installed, such as:

entry/exit codes.
number of transponders used in the system.
which transponders monitor the entrance/exit.
Entry and Exit delay times.
which transducers are used to report burglary, fire, etc.
which transducers are to be active 24 hours per day.

The CDU has a numerical display used to indicate information such as:

which openings are not secure (e.g. open window).
which openings caused an alarm.
number of seconds remaining on the entry/exit timer.

The CDU is normally in the listen mode. It periodically transmits an interrogation code to all transponders; each remote unit responds if all is well. If a unit does not respond, an alarm is initiated.

The CDU can receive at any time an unsolicited response from a transponder which either indicates intrusion or other alarm or a low battery. If it is an intrusion, or other alarm event, an alarm is initiated, or, optionally, the intrusion can be verified by interrogating the transponders, in which event the unit detecting the intrusion will not respond.

The low battery signal is stored and displayed at the CDU along with the identity number of the unit sending the signal so the user can be reminded to change that transponder's battery.

Transponders

Typically a transponder T is installed next to each secured opening and connects to the sensing switch. They can also be connected to other intrusion sensors such as infrared, microwave, and ultrasonic motion detectors or photobeams. Each transponder is individually battery powered and is intended to operate for one year without servicing. A single ultrasonic transducer is used for both transmitting and receiving. A built-in coding switch is used to program each transponder with its unique identification number when it is installed.

Normally, the transponder is in the listen mode. If it receives an interrogation from the CDU, it responds by transmitting its identity code, providing that its sensor is in the non-alarm state. If in the alarm state, it does not respond. When its sensor transfers to the alarm state, it immediately transmits its identification code to the CDU. This unsolicited response is interpreted by the CDU as an alarm. If the battery is low, it will randomly transmit a low battery code followed by its identity code.

Repeaters

Three types of repeaters are used: - acoustical repeaters AR, repeaters AC which signal over the buildings' AC wiring, and direct wire repeaters where direct connection to a point in a remote area is easily accessible. There are also extension wire connected transducers ET.

The acoustical repeater AR fastens to the door separating a protected area from the CDU. Like a transponder it is battery powered. Two parallel connected transducers are used, one on each side of the door. It is initially in the listen mode. When a burst of ultrasound is detected from either side of the door, the repeater responds by transmitting an ultrasonic burst through both transducers. It receives from either side of the door and transmits from both sides. There is a delay from reception to retransmission due to the time required to process the received signal.

In passing through a repeater an unsolicited response from a transponder is delayed once. The response due to an interrogation is delayed twice, once in each direction. This predictable delay is taken into account by the CDU. To prevent delays from compounding only one level of acoustic repeating is allowed. These delays are in addition to transit time delays due to the speed of sound.

The AC line and direct connected repeaters act as booster amplifiers. When they are not transmitting, they are relaying back to the CDU a linearly amplified version of the ultrasound picked up in that area. The resulting delay is negligible. If the CDU is concealed, an extension transducer ET can be mounted just outside enclosure via a short length of wire.

Remote Keypad

The remote keypad unit RKP is an optional device which is battery powered. It can be used to communicate with the CDU via ultrasound. If the CDU is not easily accessible, one or more of these devices can be mounted near the entrances. It has a telephone type keypad and a low power liquid crystal display (LCD). The arm/disarm codes are entered then transmitted to the CDU. The CDU transmits back a signal acknowledging successful arming or disarming which is then displayed at the remote keypad.

A single transducer is used for transmitting and receiving.

Only arm/disarm codes can be entered at the remote keypad since all programming must be done at the CDU.

"Low battery" is not transmitted to the CDU by this unit. It is displayed on the remote keypad itself since it is frequently viewed by the user.

Emergency Transmitters

Emergency transmissions can be made with battery powered hand-held devices PB which can transmit whenever they are manually activated. When activated, they transmit continuously, overriding all other communications with the CDU. There are two emergency codes so both holdup and medical crisis channels can be used in a single installation. These devices have an ID code so they can polled to insure that they are functioning.

TYPICAL INSTALLATION

The components which have just been briefly described can be arranged to protect a multiroom enclosure such as a dwelling as shown in FIG. 1. Switches are placed on all openings to the outside, doors, windows, etc. The switches at each location are connected to a transponder T. A grouping of windows and their corresponding switches can connect to a single transponder. The CDU may conveniently be mounted inside a storage room with an extension transducer ET mounted just outside the storeroom door. The CDU communicates directly with all the transponders T which are not separated by a physical barrier. Since there are no doors which close off the kitchen, living room or dining area, direct communication is possible to transponders in those areas.

The transponders in the master bedroom, bedrooms 1 and 2, and bath 1 use acoustical repeaters AR to transfer the signal from one side of their doors to the other. Because of the delay produced by acoustic repeaters only one level can be used. For this reason an AC line repeater is used in bath 2. If an acoustic repeater were used between bath 2 and the master bedroom a second level of acoustic repeating would be present which in the presently disclosed system is not allowed.

Because a wire run is easily made through the store room floor, an extension transducer can be installed in the basement to cover transponders located there. If the wire run is more than a few feet, a direct wired repeater would be used.

At the time an installation is made such as the arrangement shown in FIG. 1, the transponders T are coded with DIP switches to have an identifying preamble and identification number and the central data unit CDU is programmed to control the system, store data and process various type signals such as intrusion, low battery, entry/exit, identification of entry/exit zones and the provision of exit time delay, all as more completely described hereinafter.

PRINCIPLE OF OPERATION

Multipath Interference

The transducers in all units have fixed orientations for ease of installation and their output pattern is omnidirectional. The ultrasound is thus scattered in all directions and can be received from all directions. The ultrasound travels within a room or other enclosure from one point to the other via many paths due to reflections off walls, ceiling, floor, etc. It can go around corners in hallways, into alcoves, and other areas not separated by wall or window type barriers. It is therefore, inevitable that a transmission arriving at a recieving transducer over different paths will arrive with different phase.

If a single ultrasonic frequency is used in an ultrasonic communication system, fading can occur. This phenomenon is analogous to HF radio transmission over long distances where some of the signal reflects off the ionosphere. Fading is due to the phase difference between the same signal arriving at the receiving point via paths of different lengths. At some points in space the vector sum of these signals is zero. A pickup device at those points will not receive the signal. At other points in space the vector sum is not zero so the signal can be received there. This is known as destructive and constructive interference.

Figure 2:
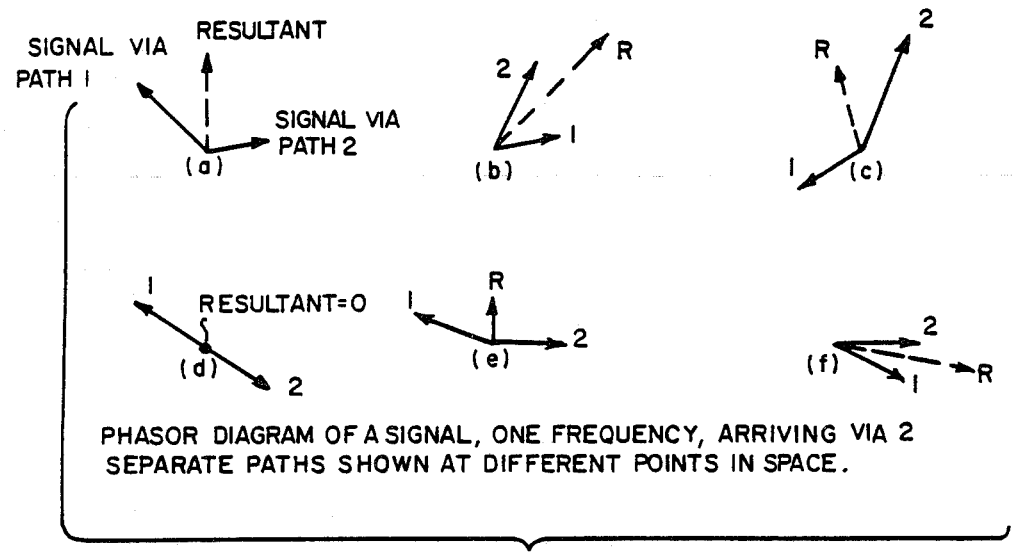
FIG. 2 is a phasor diagram useful in describing the occurence of nulls in multipath transmission of energy.

The phasor diagram in FIG. 2 is drawn to illustrate the same signal arriving via two separate paths. Actually many paths exist but FIG. 2 illustrates the phenomenon. Each diagram of FIGS. 2 (a), (b), (c), d(d), (e), and (f) represents the signal at different points in space. The amplitude and phase of the two path signals differ from diagram to diagram. In FIG. 2(d) a deep null occurs when the two signals have opposite phase and the resultant is zero. The amplitudes of the two signals are equal, but their phase differs by 180°. The probability for a null deep enough to lose the signal completely is slight, but it is finite and is dealt with in the present invention to provide a reliable system.

Figure 3:
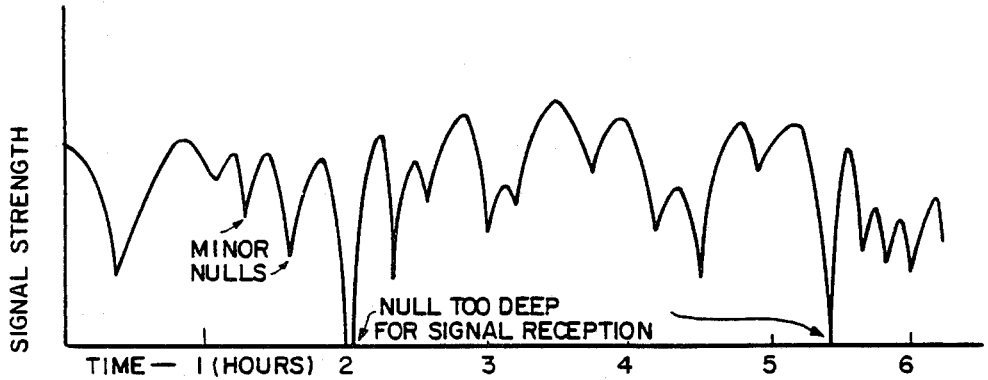
FIG. 3 is a plot of signal strength over a period of hours for an ultrasonic signal at a particular location and at a single frequency.

It is impractical to avoid deep nulls during installation. If a receiving transducer were placed at a high energy point during installation, a deep null could shift to that position later as the temperature and other climatic parameters vary the speed of sound. A typical recording of ultrasonic energy vs. time is shown in FIG. 3 for a single frequency at a single point in space. There are many minor nulls which do not affect reception over moderate distances. The occasional deep null would block the signal completely.

The location of the nulls in space shifts as the frequency is varied. If more than one frequency is used for signalling, it is extremely improbable for both frequencies to produce a deep null at the same points in space at the same time. Accordingly the present invention uses multiple frequencies in a manner which avoids the null problem.

Signalling and Coding Format

Four different frequencies are used sequentially in the presently disclosed preferred embodiment of the invention. A crystal oscillator in each unit generates a precise reference frequency, fR, typically between 25 and 45 kHz. Using digital techniques this frequency is shifted up or down by a frequency, f1, similar to single sideband modulation. Either an upper or lower sideband of f1 can be generated, fR+f1 or fR−f1 respectively. Using the same process another two frequencies are generated by shifting fR up or down by a frequency f2 producing fR+f2 or fR−f2. The frequencies f1 and f2 are typically in the range of 100 to 300 Hz and are separated in frequency enough to be separately detected in a frequency discriminator, for example 65 Hz.

FIG. 4 shows a block diagram of a typical receiver for recovering f1 or f2 signal transmissions throughout the system. An ultrasonic transducer 41 applies a signal fR+f1, or fR+f2 to synchronous detector 42 which has reference frequency fR applied as the switching frequency to detect the sideband that is present. The output of detector 42 is applied to a bandpass filter 43 which passes frequencies f1 and f2 and rejects frequencies outside the band. The detected and selected sideband, f1 or f2, is amplified in amplifier 44 and applied to frequency discriminator 45. Since the high frequency components are filtered out only the difference frequency is amplified. If fR−f1 or fR+f1 is received, f1 emerges from the bandpass pass filter 43. Likewise, if fR−f2 or fR+f2 is received, f2 results. The frequency discriminator 45 after the amplifier 44 measures the frequency and produces a logic level at either its f1 output 46 or at its f2 output 47. It is not important whether the upper or lower sideband is received; only that f1 or f2 can be recovered and can be distinguished from one another to produce either an f1 or f2 output at terminals 46 or 47.

Referring to FIG. 5, the formatting for data transmissions will be described. Each unit can act as the transmitter for a given condition. During normal supervised mode the CDU periodically initiates a scan which interrogates all other units to establish, by their recognized responses, that the entire system is operative and secure. Transponders can initiate a transmission to the CDU (an unsolicited response) to report alarm or low battery condition. The remote keypad and the emergency unit can also initiate transmissions. In each instance when transmission is in progress the system locks out initiation of other transmission until the end of the scan in progress to assure processing the data from various sources without interference.

The transmission scan is represented in FIG. 5 and is shown having N time slots. An offset of f1 is assigned to the odd numbered time slots, and an offset of f2 to the even numbered time slots. A data bit consists of an odd followed by an even time slot. If a binary one is sent, a burst of ultrasound is sent in both time slots for that data bit—first an offset by f1 then an offset by f2. The recovery of either or both f1 and f2 defines a binary one. One or the other of the transmissions f1 and f2 may be lost due to a deep null. If fR+f1 is transmitted in the first half, odd time slot, fR−f2 will be sent in the second half, even time slot. This ensures a greater frequency separation reducing the probability of both transmission frequencies being lost in the same null.

The first four data bit positions, eight time slots, are assigned to the preamble, Data Bits, A,B,C,D. This preamble defines the ultrasonic transmission as to type of interrogation, response, data transmission, or emergency.

The following preambles are transmitted and recognized as binary words:

|  | Preamble Bits ABCD |
| --- | --- |
| CDU | |
| Interrogate with Reset | 1110 |
| Interrogate without Reset | 1100 |
| Transponder | |
| Unsolicited Response - Alarm | 1000 |
| Unsolicited Response - Low Battery | 1001 |
| Remote Key Pad | |
| Data Transmission | 1101 |
| Emergency Unit | |
| Hold Up | 1010 |
| Medical Emergency | 1111 |
| Low Battery (same as transponder) | 1001 |

The first bit A in the preamble is always a binary one. When the first f1 is detected, time slot 1 is established in all units by a timer in each unit which starts and establishes the frame of reference for the time slots. If f2 is detected first, it means that f1 was lost in a deep null. To compensate for this delayed start the timer is advanced by one time slot.

When the CDU interrogates the transponders, it sends out the appropriate preamble. Each transponder receives this preamble and responds in one of the time slots. Only one time slot per transponder, as preset by a DIP switch which establishes its identity number as a time slot code position is used per response to reduce the scan time. Transponder 1 responds during time slot 9, i.e., after the eight time slots for the preamble. It responds at that time by sending a burst of ultrasound which is offset in frequency by f1 from fR since slot 9 is an odd time slot. Transponder 2 responds during time slot 10 offset in frequency by f2 from fR since it is an even time slot.

Each transponder responds with the appropriate offset frequency f1 or f2 and either above or below fR. The next time each unit responds, it does so with the same frequency offset f1 or f2 but on the opposite side of fR. If a response is not detected from a unit during one interrogation due to a deep null, interrogation is repeated. On this second interrogation each transducer, including the one which was not detected on the previous interrogation, responds with its frequency offset on the opposite side of fR and will be received. Since deep nulls are rare, double interrogations are infrequent and the probability that two successive responses offset on opposite sides of fR will be in a deep null is negligible.

When a transponder sends an unsolicited response due to an intrusion or low battery, it does so using two time slots per data bit to be sure this attention demanding signal is received by the CDU. A transponder originating a transmission is the only unit transmitting at that time so there is no crowding of data. For such conditions the first bit in the preamble locks out all other units for the duration of the scan. The CDU recognizes the preamble as an intrusion or low battery condition then awaits a response in a numbered time slot which defines the identity number of the transponder by its arrival time within the scan.

The data transmission of a transponder after sending its preamble occurs during its assigned time slot and at its assigned frequency offset. It transmits again in the next time slot still at its assigned frequency but offset on the opposite side of fR. For example: —If transponder #5 detects an intrusion it responds with fR+f1 in bit position 13. Then it transmits fR−f1 in bit position 14. If fR+f1 is lost in a deep null, only fR−f1 will be detected in time slot 14. The CDU knows from the preamble that an unsolicited response is being received. It also knows that f1, which is detectd as a first signal in time slot 14, is not assigned to that slot, therefore, it must be the second transmission from transdponder #5 and is processed as an event identified by the preamble and localized by the time slot 14 arrival time which is the "next time slot" allocated to transponder #5.

Another reason for assigning different frequencies in alternate time slots is reverberation. One frequency is allowed the duration of two time slots for its reverberation to die down. At the alternate time slot, the frequency assigned to that slot will be stronger than the reverberation from the previous frequency. Since the assigned frequency is stronger, it will predominate and be detected by the frequency discriminator. The frequency discriminator can only select one frequency and its selects the strongest if both are present.

DETAILED DESCRIPTION OF THE SYSTEM

Transponder

Figure 7B:
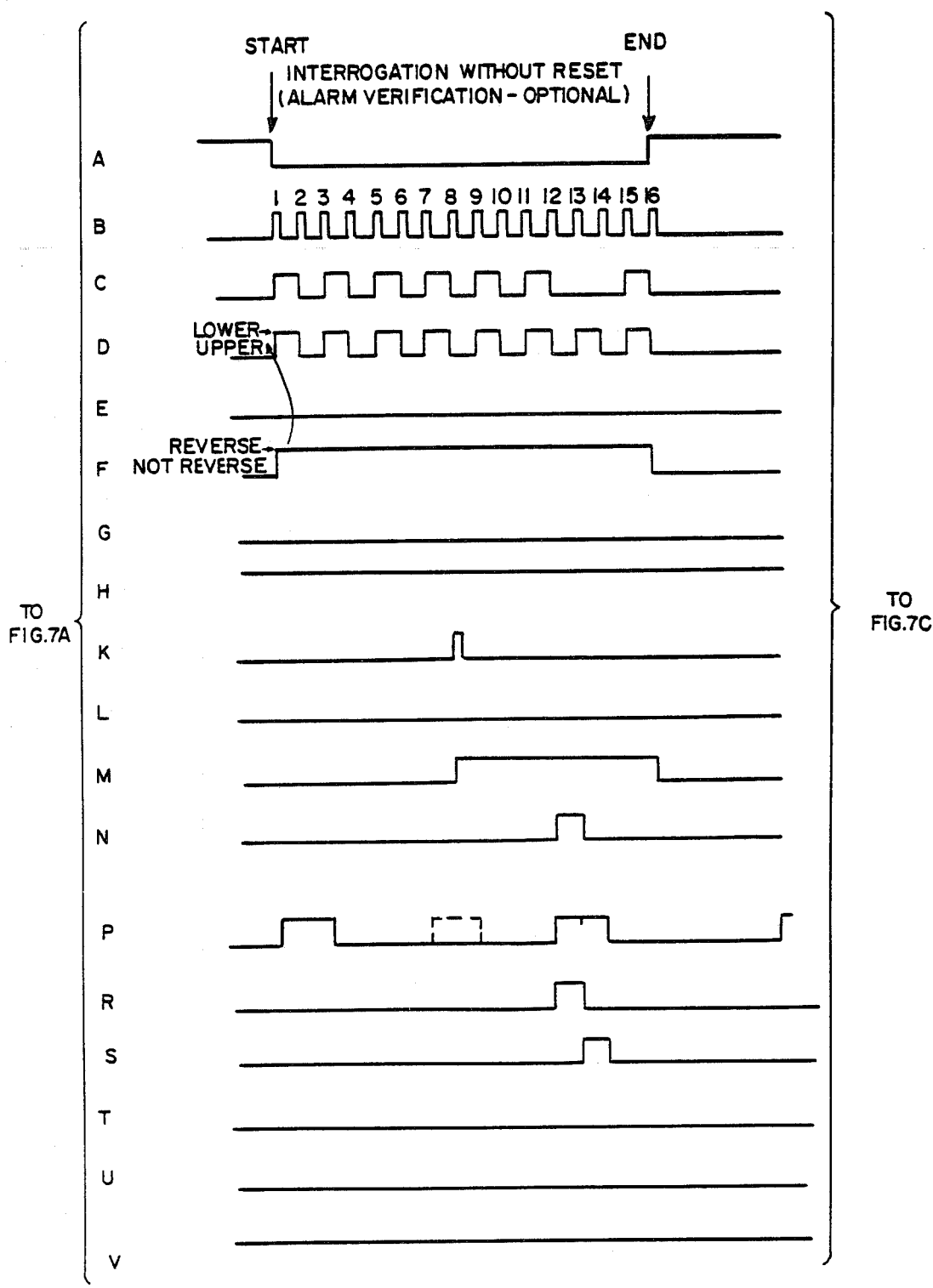
FIG. 7 (made up of FIGS. 7A, 7B and 7C) is a waveform diagram showing signal timing in the operation of the transponder of FIG. 6.
Figure 7C:
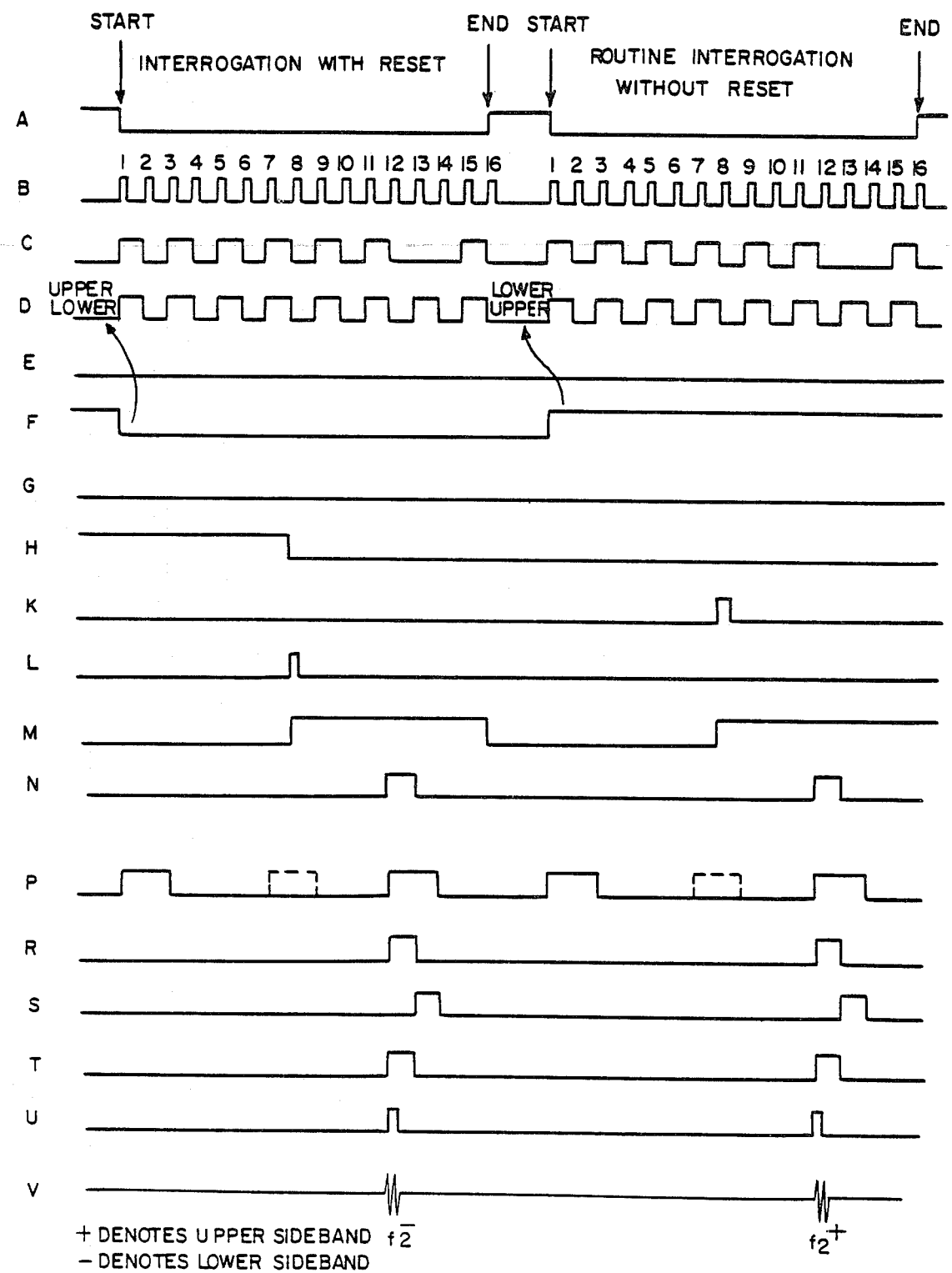

Referring now to FIG. 6 which is a block diagram and FIG. 7 which is a waveform and timing diagram, the transponder will be described in detail. The transponder is disclosed as a custom made CMOS integrated circuit (IC) for small size and low power consumption and includes terminals for connection with particular external circuits and components. This IC provides economy of manufacture in this form and also is designed to be used in all the units of the system which require its various functions. Thus, the IC can be connected to different external circuits and components to provide the desired functions of each unit.

A crystal oscillator 31 operates continuously and generates fR, the reference frequency, which drives frequency divider 32. The frequency fR is divided down to produce the offset frequencies f1 and f2 and drives a timer 33 via AND gate 3 at a frequency, for example of 200 Hz. When the timer reaches its maximum count, its output, A, is high and inverter 1 produces a low level. In the transponder the "continuous operation" terminal of the IC is held low hence the output of OR 2 is also low. As long as the output of OR 2 is low AND 3 blocks the signal from the frequency divider 32 to the timer 33; therefore, the timer 33 stops when it reaches its maximum count. An intrusion event presets the timer 33 to start a scan by initiating a count as will be hereinafter described.

It can be seen that by raising the "continuous operation" input to the IC, OR 2 supplies a high state to AND 3 continuously thus causing the timer to operate continuously and not stop at its maximum count. This feature is used by the emergency reporting unit which will be described later with reference to FIG. 11.

Intrusion

For an intrusion event the security system provides for actuation of a switch 34 or its equivalent as the sensor responsive to the intrusion. The sensor provides a high level to the sensor input when the switch 34 opens, waveform E, FIG. 7. If a "lockout" latch 35 is not set its output, H, is low. The H output is converted to a high state by inverter 4 the output of which is applied to AND 5 then OR 6 to pass the intrusion signal. If the timer 33 is at its maximum count its output, A, is high; therefore, AND 7 passes the intrusion signal and sets the intrusion latch 38. The intrusion signal from AND 7 also presets the timer 33 to the 1 count via OR 8 and AND 9. The timer 33 then counts until its maximum count is reached. In the timing diagram, FIG. 7, the maximum count is shown at 16 for simplicity. Normally, a larger number would be used, such as 32 or 64. When the timer 33 is operating, a data clock is generated, waveform B, defining the time slots.

When the timer 33 is preset, waveform A drops and a preamble encoder 36 is activated generating the ALARM code. The preamble ALARM code is wire-programmed via the external terminals 37 of the IC. The high state from an "intrusion" latch 38 reaches AND 10 via or 11. This state gates the preamble, which arrives via OR 17 through AND 10, to OR 12 then to AND 27, waveform T. Waveform T arrives at AND 27 via an external connection 39 from an "internal data output" terminal 61 which jumper 39 connects to a "data input" terminal 62. The "data input" terminal 62 is used without connection 39 by other system components such as the CDU and remote key pad to inject data directly to AND 27.

The data clock, waveform B, has the correct duty cycle for transmission. The data clock gates the data arriving from terminal 62 through AND 27; the resulting signal is then used to modulate the ultrasonic signal for transmission. As shown in waveform T, U, and V in FIG. 7 under the heading UNSOLICITED RESPONSE (ALARM) the ALARM preamble 1000 and the transponder identity number are transmitted in the manner now to be described.

The instantaneous ultrasonic frequency for transmission is generated by a frequency synthesizer 63. Waveform D from the timer 33 toggles at half the data clock rate. Waveform C is fundamentally the same as waveform D except its polarity can be controlled by Exclusive OR 18. As C toggles, it alternately gates f1 and f2 into the frequency offset input 64 of the synthesizer 63. When the output of Exclusive OR 18 is high, AND 13 conducts and AND 12 does not. When the output of Exclusive OR 18 is low, AND 12 conducts and AND 13 does not.

Waveform D reaches an upper/lower sideband control input 65 of the synthesizer 63 via Exclusive OR 15. As waveform D toggles, it alternately selects the upper and lower sideband. Each time the system operates to initiate a scan, a sideband reversing flip-flop 66 toggles, to produce waveform F. This toggles reverses the polarity of waveform D in Exclusive OR 15 so on alternate scans the opposite sidebands of each offset frequency are used.

The data pulses, U, from AND 27 key the synthesized ultrasonic frequency $f_o$ to the signalling output of AND 16 which in turn drives a transducer 41 with waveform V. Waveform U also disables the frequency discriminator 45 during transmission so the transmitted signal will not be detected. In this example the transponder has its identity number encoder 71 programmed with number "4". Programming is done with a DIP switch 72 connected as an external circuit. When the code "4" time slot is reached, i.e., time slot 12, "Time Time Slot" output 73, produces a pulse waveform R. Pulse R passes through OR 17, is then gated through AND 10, and passes through OR 12 and AND 27, eventually reaching AND 16 which gates an ultrasonic frequency for transmission which is offset by f2 during time slot 12. A pulse, waveform S, then emerges from a "Next Time Slot" output 74 of the identity encoder 71 in time slot 13. This pulse, waveform S, reverses the waveform C output from Exclusive OR 18. Normally, an f1 offset would be sent in position 13. This reversal in waveform C generates an offset of f2 instead. The offset of f2 is the opposite sideband from time slot 12 because waveform D continues to alternate normally. Thus the two data pulse transmissions at the same frequency offset representing an alarm are separated in carrier frequency to avoid nulls as previously described.

As the scan ends the maximum count in timer 33 is reached and timing stops. Waveform A goes high and the "intrusion" latch 38 resets. The falling edge of waveform G sets the "lockout" latch 35. Waveform H goes high causing inverter 4 to supply AND 5 with a low state. No further alarms can be reported since AND 5 then blocks the sensor input.

Interrogation Without Reset-Alarm Verification

When an alarm transmission is received by the CDU it may optionally be programmed to send an interrogation for alarm verification. For this option the CDU sends out the "Interrogate Without Reset" preamble 1100. The signalling for this condition is indicated in FIG. 7 under the heading: INTERROGATION WITHOUT RESET (ALARM VERIFICATION-OPTIONAL). The first data bit of this preamble is a binary 1. An offset of f1 is sent followed by an offset of f2. The received signal at the transponder (FIG. 6) is synchronously detected using fR as a reference as previously described (FIG. 4).

The first signal, f1, is recovered by the bandpass filter 43, amplifier 44, then frequency discriminator 45. The F1 terminal of discriminator 45 goes high which reaches AND 9 via OR 8. The timer 33 is stalled at its maximum count, output A is HIGH, so AND 9 passes the F1 logic level presetting the timer 33 to a number 1 which starts the scan interval as has been described. If f1 were lost due to a deep null, only f2 would be detected in the second half of the first data bit. In this case, AND 19 would conduct passing the F2 output of the discriminator 45 thus presetting the timer to a number 2 to compensate for the late start.

A preamble decoder 67 receives its data, the F1 or F2 detected outputs, from OR 25. At the end of the eighth time slot the preamble is decoded by decoder 67. In this example upon decoding the preamble 1100 an output emerges from the "Interrogate Without Reset" terminal of decoder 67 as waveform K which passes through OR 20 to set a "Respond to Interrogation" latch 68.

When latch 68 is set, waveform M goes high. The output from inverter 4 is low due to the "lockout" latch 35 being set. When it is time to respond (time slot 12), waveform R goes high; but it is blocked by AND 21 so no response is transmitted. A response is never sent during the next time slot, (13 in this example) during an interrogation since AND 10 is blocking as the "intrusion" latch 38 (waveform G) is not set. This lack of response in time slot 12 is interpreted by the CDU as an alarm condition.

Interrogation With or Without Reset

The CDU can interrogate with or without reset at any time according ot its program or keyboard command. As previously described, "Interrogation Without Reset" is used to confirm an intrusion condition. In addition it may be desirable to delete areas of protection while maintaining surveillance in other areas. By interrogating such areas without reset the first response after an intrusion sensing event (e.g., a door opening) sets the intrusion latch 38 and lockout latch 35 is set until such time as a preamble code for interrogation with reset is transmitted.

During the armed condition when the premises are protected by the system the CDU transmits supervisory interrogations periodically, e.g., once every 1½ minutes, and these scans occur with reset to assure repeated responses indicating that all is well. When the premises are occupied the system can be disarmed or selective areas can be set to respond while others ignore the interrogation from the CDU as will be described. The last two scans show in FIG. 7 show routine interrogations with the offset reversing of sidebands on alternate scans due to waveform F.

Interrogation With Reset

During normal coonditions the sensor input is low (window closed, etc.). As previously described for the "Interrogation Without Reset", the timer is started upon receipt of an F1 or F2 output from the discriminator 45 and the preamble decoder 67 supplies an output, this time via the "Interrogate With Reset" terminal, waveform L. This pulse L immediately resets the "lockout" latch 35 such that its output H drops and the output of inverter 4 rises. This state allows "This Time Slot" pulse, R, to pass through AND 21 so an offset of f2 can be transmitted during time slot 12; the CDU thus receives a normal response.

If the "lockout" latch 35 is not set and an intrusion occurs while a scan is in process, a "wait" latch 74 is set. Since the timer 33 is operating, its output, waveform A, is low. AND 7 will not pass the intrusion signal; hence, the "intrusion" latch 38 will not be set. Inverter 22 supplies a high state to one input of AND 23 which causes the intrusion signal to set the "wait" latch 74. At the end of the scan the "wait" latch 74 is reset as waveform A goes high. The falling edge from the output of the "wait" latch activates a delay circuit 75. At the end of the delay, the delay circuit 75 sets the "intrusion" latch via OR 6 and AND 7. A normal unsolicited response indicating intrusion is then initiated.

Low Battery Indication

The battery voltage is monitored by a "low battery" detector 76. Near the end of battery life, but before it becomes useless, the "low battery" detector 76 starts generating widely spaced random pulses. If a scan is not in process, AND 24 passes the low battery signal setting a "low battery" latch 77. At the same time the timer 33 is preset to a number 1 via OR 8 and AND 9 starting a scan. The "low battery" latch 77 changes the preamble in preamble encoder 36 so the CDU will know a "low battery" is being reported and not an alarm. This change in preamble from 1000 to the low battery preamble 1001 is indicated in FIG. 7, waveforms P, T, and V by the dotted lines additions thereto. The low battery preamble, and waveforms R and S pass through OR 17 and AND 10 to be transmitted just like the intrusion signal previously described.

If a scan is in process, the message is not transmitted but eventually one will be sent. It takes days before the battery becomes useless after the "low battery" detector starts generating pulses so there is no urgency regarding this transmission.

Other Functions

Many circuits or sources of signals may be connected to the external terminals of the IC to adapt it for use by the other system components as will be described. A "Signal Received in Last Data Bit Position" output 78 is not used by the transponder. This signal is only used by the remote key pad unit and is generated in the following manner. If a data bit is received at the last bit position of a scan time, a pulse from the timer 33 occuring at that time is gated to the output terminal 78 via AND 26.

CENTRAL DATA UNIT (CDU)

Referring to FIG. 8 the arrangement for using the IC of FIG. 6 as the Central Data Unit will be described. A standard microcomputer, $\mu C$, such as the Intel 8048 is programmed to control the system, store data such as intrusions, low battery, entry/exit zones and time delays. As shown in FIG. 8 the μC and the same IC developed for the transponder are connected to peripherals to complete the CDU.

The CDU does not have an identity number so that input to the IC is not used. When interrogating, the μC injects the "with" or "without reset" preamble into the IC. The reference frequency, fR, is derived from the μC clock which is crystal controlled. Thus a separate crystal is not used with the IC but fR from the μC is injected directly into crystal input 1.

Several outputs from the IC are provided for the μC. The timer output indicates to the μC that a scan is in process. The data clock is used to manage the time slots. Received data is obtained by the μC from the "f1 received" and "f2 received" terminals. The μC inputs data directly into the "Data In" terminal 62 of the IC and uses the "Internal Data Output" terminal 61 primarily to route the preamble back to the "data in" terminal 62 at the appropriate time.

The transducer drive and detection circuitry are the same as that in the transponder. In addition there are interface circuits 81 and 82 to permit the use of direct wire and AC power line repeaters, see FIG. 1.

The μC is programmed to the requirements of the individual installation via its key pad 83. A 2-digit 7-segment display 84 indicates which transponder needs attention: -door or window open, low battery, etc. An "armed/disarmed" display 85 is provided. A "low battery" indication 86 along with the identity number of the transponder shown on the 7-segment display 84 points out which transponder needs a battery. The key pad 83 is also used for arming and disarming the system using special code numbers. When an intrusion or other alarm event has been detected an alarm relay 87 communicates this information in known manner. Additional outputs are available so a suitably equipped communicator can furnish additional information if the alarm is due to hold up, medical emergency, or fire.

The CDU is powered from the AC line through power supply 88 and the unit is rendered immune to AC power failure by means of a stand-by battery 89.

Acoustical Repeater

A feature of the present invention is the acoustical repeater as shown in FIG. 9 which enables the system to operate through closed doors and walls using ultrasonic energy for transmission.

The repeater has no identity number so those terminals on the IC are not used. Its preamble is wire-programmed for the transponder code indicating low battery and is only used during "low battery" transmission originating from the repeater.

When any preamble is received, the scan interval time starts. As code bursts are received, "f1 or f2 received" terminals trigger the pulse generator 91 via OR 1. Assuming the "low battery" latch 77 (FIG. 6) is low, inverter 2 supplies AND 3 with a high state. This state allows the pulse from the pulse generator 91 to reach the "data input" terminal via OR 4. If f1 is received, the synthesizer inside the IC is still generating f1 so the pulse causes f1 to be retransmitted immediately. Likewise if f2 is being received, f2 will be retransmitted immediately.

The repeater is powered by a local battery which is also connected to a "low battery" detector 92. If a low battery condition is detected, the "low battery" latch 77 inside the IC is set. The output of inverter 2 causes AND 3 to stop conducting and AND 5 routes the internal data back to the "data input" terminal. This circuit allows an unsolicited response to be sent with the transponder "low battery" preamble. No identity number is sent. At the end of this scan a "verification" latch 93 is set. Inverter 6 drops the signal input to AND 3 and for the duration of the next scan the repeater cannot transmit. Because it does not retransmit the responses its transponders cannot respond to the CDU. The transponder identity number thus indicates to the CDU which repeater has a low battery. At the end of this scan the verification latch 93 is reset so subsequent signals will be repeated.

The transducer driving and signal detection circuitry is identical to that in the transponder except two transducers are connected in parallel, one for each side of the door, as shown. The repeater can also be used for signal boost on long distance links such as in a long hallway where the distance is such that the attenuation makes reception unreliable.

The repeater is normally in a listen mode with its receiver circuits and crystal oscillator 31 operating from its local battery.

Remote Key Pad

The remote key pad shown in FIG. 10 has no identity number so that input to the IC is not used. The Remote Key Pad unit is used to arm and disarm the system from a location remote from the CDU. Thus, where the entrance/exit door is too far from the CDU to permit convenient use, a Remote Key Pad unit can be kept near the door used to enter and leave the premises.

Data is manually entered into the key pad keyboard 101 which enters it serially into a shift register 102. The number of digits entered are counted in counter 103 and the entry of data from keyboard 101 also starts a timer 105 which sets a short interval during which code can be entered. When the correct number of digits for a code is received, the output of digit counter 103 goes high. This output causes "code entered" to be displayed on display 104 and applied to Sensor Input on the IC via AND 2. If an incomplete code is entered, no further restarts are accepted by the timer 105. At the end of the timing interval the timer 105 clears the shift register 102 via OR 1. The shift register 102 can also be manually cleared by reset button 106. The timer 105 is disabled when the correct number of digits have been entered thereby preserving data entered in the shift register 102 for processing.

If a scan is in process in the CDU or a transponder the output of timer 33 in the IC is low and AND gates 2, 4, and 6 are disabled. If no scan is in process, the IC timer 33 output is high. The maximum count signal from the digit counter 103 passes through AND 2 and to the "sensor" input of the IC which starts a scan. A "data send" latch 107 is also set. The "lockout" latch 35 in the IC is disabled by grounding that terminal on the IC. The data clock waveform B is then gated into the shift register 102, sequencing the data from the shift register 102 into the "data in" terminal of the IC for transmission. At the end of the scan interval the "data send" latch 107 and digit counter 103 are reset by timer 33 output going high.

If the arming code is sent, the CDU initiates an "Interrogate With Reset". If all transponders respond, the system is armed (i.e., all lockout latches 35 reset) and the CDU sends a binary 1 in the last data position. The IC supplies a pulse from the "Signal Received in Last Data Position" terminal. This pulse arrives just as the IC timer 33 is making its transition at the end of the scan. This sets an "Armed/Disarmed" display latch 108 via AND 4. "Armed" is displayed on display 109. The signal is always received in the last data position whenever the CDU is armed. If the CDU did not arm due to an open window, no pulse is received in the last data position and the output of inverter 5 is high when the IC timer 33 makes its transition at the end of the scan. This condition resets the "Armed/Disarmed" latch 108 via AND 6 thus displaying "disarmed" on display 109.

Since this device is viewed frequently by the user, it displays "low battery" directly on a "low battery" display 110 when the battery is low rather than transmitting it to the CDU.

Emergency Reporting Unit-"Panic Button"

The Emergency Reporting Unit (sometimes referred to as a "panic button") is shown in FIG. 11. This unit responds to interrogations from the CDU just like a transponder. It has an identity number programmed by a DIP switch so it can be monitored by responding to interrogation. The preamble is wire-programmed with the transponder code 1001 so it can report "low battery" as described for the transponder.

The unit has a switch 111 which is used to select one of two modes: "Medical Emergency" or "Hold-Up" (i.e., robbery in progress). When a start button 112 is pressed, an "emergency" latch 113 is set. Its output goes high enabling AND 1. If switch 111 is in the "Medical Emergency" mode, a continuous high state from the battery passes through AND 1 to the "data in" terminal via OR 4. Also, the "continuous operation" input is high preventing the interval timer 33 in the local IC from stopping at the end of the scan interval. Inverter 2 disables AND 3, so internal data will not reach the data input.

The high state at the "data in" terminal causes a 1111 ... from the data clock, waveform B, to be sent continuously via AND 27. It does so until a "stop" button 114 is pressed which resets the emergency latch 113. AND 1 then stops supplying a high state to the "data in". AND 3 now conducts the "internal data output" to the "data in" permitting a normal response to interrogation. Also, the "low battery" signal can be sent.

If the emergency unit is in the "Hold-Up" mode (switch 111 connected to "Hold-Up") when the emergency latch 113 is set, a 101010 ... code is sent continuously. Since two time positions are used for a single data bit, and alternate data bits are ones and zeros, the data clock is divided by 4 in dividers 115 to send this code. This divider 115 supplies AND 1 with a high state for two time slots, then a low state for the next two time slots, etc. The "Hold-Up" mode is stopped as before by pressing the stop button 114.

The CDU is programmed to recognize the different preambles. The first 4 bits of the continuously transmitted medical emergency code (1111) is recognized by the CDU as a medical emergency preamble and generates an alarm and indicates to the communicator via a separate output, FIG. 8, that it is a medical emergency. By transmitting this continuously it will eventually be detected by the CDU even though other communication may be occurring when the medical emergency code is initiated. As soon as the CDU can receive again, the first 4 code bits received will be recognized immediately. Likewise if a hold up code is generated and transmitted (101010 ... ), the first 4 bits received by the CDU (1010) will be recognized by the CDU as the hold up preamble and will initiate an appropriate alarm.

OPERATION

The operation of the system will be clear from the foregoing detailed description. Several additional features of the invention will be briefly reviewed.

Arming and Disarming the System (at the CDU)

The "arm" code is entered into the keypad. If a window is ajar, the CDU rejects the arming request and displays the identity number of that window. The window is then secured and the "arm" code is entered again. If successful this time, "ARMED" is displayed; the exit timer starts. The user has this length of time to exit without causing an alarm. Only the door which has been designated as the entrance/exit can be used or an immediate alarm results.

When the user returns, he enters via the same opening. When that door is opened, the entrance timer starts which gives him time to reach the CDU and key-in the "disarm" code. Entry via any other opening results in an immediate alarm. If too much time is taken without disarming the system, it will to into alarm at the end of the entry delay. More than one opening can be designated as an entrance/exit.

Arming and Disarming the System at the Remote Keypad

This procedure is the same as for using the CDU. However, if an arming request is rejected, the user must go to the CDU to see which door or window is not secured.

Deleting Zones

Using the keypad on the CDU it can be programmed to disregard any area during the hours of protection. The owner of a small business can occupy his office while the rest of his facility is secure. The transponders in his area are ignored by the CDU. The activation of any other transponder results in an immediate alarm.

Control of Battery Drain

During the day some doors are used constantly. If a transmission occurred each time the door were opened, the battery life would be greatly reduced. This can be prevented as part of the alarm verification sequence. When a door is opened, the transponder transmits its unsolicited response and sets an internal latch. When interrogated to verify the alarm, that transponder does not respond because its latch is set. Also, if the door is opened again, it will not transmit its unsolicited alarm code because of the set latch.

Since there are two interrogation codes, one, "interrogate without reset", which is used to verify an alarm and the other "interrogate with reset" which resets the latch restoring the transponder to normal operation each can be used selectively to control particular transponders. During the day the transponders which are monitoring openings 24 hours per day are monitored using the "interrogate without reset" code. The first time a frequently used door is opened it sends its code and sets its latch. If the system is disarmed, the CDU ignores this transmission and the first alarm during occupancy hours can be discarded. Further transmissions are not possible because of the set latch; thus, the battery is conserved. When the system is armed, an "interrogate with reset" code is sent to all transponders. This resets all latches if all openings are secure and full security for all sensors is then operative.

While the invention is not limited to any particular values for the parameters assigned, the values for a typical small (e.g., dwelling house) system will be given.

If the basic ultrasonic carrier frequency fR = 25 kHz, the offset values can be obtaining by digital division to obtain non-harmonically related sideband frequencies of approximately f1 = 130.21 Hz and f2 = 195.31 Hz. The frequency synthesizer 63 generates $f_o$ as in a single sideband transmission with only one of the four frequencies fR+f1, fR−f1, fR+f2, or fR−f2, transmitted at any given time slot as controlled by inputs 64 and 65.

The interrogation scan may be programmed to occur once every 90 seconds with a duration of 15 seconds per scan. If there are 32 slots this gives approximately 0.47 second per slot. The data clock generates one pulse per slot. The transmission burst within a slot is 60 ms thus permitting adequate transit time for propagation delay to near and far transponders and still receive the response within the slot.

The filter for selecting f1 and f2 from the output of the synchronous detector is preferable passive to conserve battery power in the self contained units. For this purpose a gradual band pass roll off is used to avoid ringing initially about 6 db/octave with f1 and f2 at approximately the 3 db down frequencies and with 12 db/octave roll off on the skirts of the curve.

Obviously other values for the above specified parameters can be used to meet the requirements of compatibility with other equipment (e.g., ultrasonic intrusion detectors) or to expand the system for large commercial installations.

Many modifications of the invention and a multitude of diverse uses and applications of the teachings will now occur to those skilled in the art. The invention, accordingly, is not to be limited to the system disclosed or the uses suggested but encompasses the broad scope of the appended claims.

I claim:

1. A wireless data communication system operable to transmit information as ultrasonic frequency signals which are subject to loss caused by nulls due to multipath signal cancellation at a receiving station comprising:
    a plurality of spaced stations capable of transmission and reception at a plurality of different ultrasonic frequencies sufficiently separated in frequency to spatially separate the respective locations of nulls of said different frequencies due to multipath propagation between communicating stations;
    means for transmitting said information by modulating each of said ultrasonic frequencies with the same data bits and transmitting each said data bit at said different ultrasonic frequencies; and
    ultrasonic receiving means at each receiving station for recovering said data bits by detection of any one or all of said ultrasonic frequencies.

2. A supervised wireless security system using ultrasonic frequency transmissions subject to loss of signal caused by nulls due to multipath signal cancellation at a receiving station comprising:
    a central station and one or more remote stations each capable of transmission and reception at a plurality of different ultrasonic frequencies sufficiently separated in frequency to spatially separate the respective locations of nulls of said different frequencies due to multipath propagation between communication stations;
    means at said central station for repeatedly transmitting said different ultrasonic frequencies for interrogating said remote stations, each said transmission being code modulated to transmit each code symbol as redundant information;
    means at said remote stations for recovering said information by detection of each said symbol of the code modulation from any one of said different ultrasonic frequencies received at said remote station, and
    means at said remote stations responsive to said information recovered for transmitting an ultrasonic signal to said central station in response to said interrogating.

3. The system according to claim 2 and including alarm-event sensors, and
    means coupling at least some of said remote stations to respond to an alarm-event sensed by said sensors for preventing transmission of said ultrasonic signal to said central station.

4. The system according to claim 3 wherein said some remote stations include:
    means for transmitting an ultrasonic signal upon sensing said alarm-event when interrogating by said central station is not in progess.

5. The system according to any of claims 2, 3, or 4 and including at least other of said remote stations comprising repeater means responsive to said recovered information for retransmitting said information after a time delay.

6. Apparatus according to claim 5 wherein said repeater means includes two ultrasonic transducers connected in parallel for both reception and transmission, and means for mounting said transducers with their acoustic axes oriented in different directions.

7. Apparatus according to claim 6 wherein said two transducers are adapted to be mounted on opposite sides of an ultrasonic energy barrier.

8. The system according to claim 4 wherein transmission of said ultrasonic signal from said some remote stations upon sensing said alarm event includes transmission of redundant information representing said alarm event sequentially at different ultrasonic frequencies.

9. The system according to claims 2, 3, 4, or 8 wherein said transmission of redundant information is provided by means for transmitting sequentially at least two ultrasonic energy bursts offset in frequency as sidebands of a suppressed carrier and offset from each other enough to produce substantially different spatial patterns of nulls due to multipath transmission.

10. The system according to claim 9 wherein two different sideband frequencies can be selectively transmitted with suppressed carrier and each sideband frequency can be selectively transmitted as the upper or lower sideband offset from said carrier.

11. Apparatus according to any of claims 2, 3 or 4, wherein said remote stations include a battery to operate said remote stations from local battery power.

12. Apparatus according to claim 10 wherein said transmissions are formatted as multibit preamble followed by at least one data bit wherein the ones in said preamble are sequential transmissions of said two different sideband frequencies and said data bit is transmitted as one of said sideband frequencies.

13. Apparatus according to claim 12 wherein said data transmission identifies the remote unit making the transmission.

14. Apparatus according to claim 13 wherein said data bit is transmitted as two sequential bursts of said one sideband frequency one being the upper sideband and the other being the lower sideband.

15. Apparatus according to claim 10 wherein said remote stations operate from local battery power and at least some of said remote stations have low battery detectors, and means responsive to said low battery detectors for transmitting a preamble representing low battery and data identifying the remote station making the transmission.

16. Apparatus according to claim 12 and including a battery powered remote unit programmed to send on command a preamble and data coded for arming and disarming the system, means for initiating said command, and said central unit includes means responsive respectively to reception of an arming or disarming coded transmission for arming or disarming the system.

17. Apparatus according to claim 12 and including a battery powered remote unit programmed to send selectively emergency message data, manually operable means for initiating transmission of said emergency message data and means at said central station responsive to reception of said emergency message data for preempting other operations during receipt of such emergency message data.

18. Apparatus according to claim 7 wherein said remote stations include a battery to operate said remote stations from local battery power.

19. Apparatus according to claim 14 wherein said remote stations include a battery to operate said remote stations from local battery power.

20. An ultrasonic wireless security system comprising:

a central station operable for repeatedly sending an ultrasonic interrogation transmission and receiving ultrasonic responses;

a plurality of sensors located throughout the premises to be protected and operable by a local alarm event to produce a sensor output;

a plurality of battery powered ultrasonic transponders one located at each sensor, said transponders responsive to said sensor output to initiate an unsolicited ultrasonic transmission and responsive to receipt of an interrogation transmission for producing a solicited ultrasonic signal transmission response in the absence of said sensor output, each of said ultrasonic transmissions from said central station and said transponders being provided by means for transmitting sequentially at least two ultrasonic energy bursts offset in frequency from each other enough to produce substantially different spatial patterns of nulls due to respective multi-path transmission of said ultrasonic energy bursts, and alarm means at said central station responsive to receipt of said unsolicited ultrasonic transmission or the absence of receipt of said solicited ultrasonic signal transmission response after an interrogation transmission.

21. The system according to claim 20 and including battery powered two-way ultrasonic repeater means for transferring said ultrasonic transmissions and responses between said central station and any of said transponders separated from said central station by an ultrasonic energy barrier, said repeater means having parallel transducers mounted on opposite sides of said barrier.

22. The system according to claim 17 or 20 wherein each battery powered unit has means for transmitting a identifying ultrasonic signal for low battery condition.

* * * * *

UNITED STATES PATENT AND TRADEMARK OFFICE
CERTIFICATE OF CORRECTION

PATENT NO. : 4,367,458
DATED : January 4, 1983
INVENTOR(S) : Kenneth R. Hackett

It is certified that error appears in the above—identified patent and that said Letters Patent is hereby corrected as shown below:

Column 1, line 22, change "Open" to --Other--

Column 5, line 10, insert --be-- before "polled"

Column 6, line 13, change "d(d)," to --(d),--

Column 9, line 62, change "or" to --OR--

Column 10, line 41, change "Time Time Slot" to --"This Time Slot"--

Column 11, line 48, change "ot" to --to--

Column 16, line 24, change "to" to --go--

Column 19, Claim 14, line 6, after "frequency" insert a --,--

Signed and Sealed this

Thirteenth Day of September 1983

[SEAL]

Attest:

GERALD J. MOSSINGHOFF

Attesting Officer

Commissioner of Patents and Trademarks